US007647368B2

(12) United States Patent
Ford et al.

(10) Patent No.: US 7,647,368 B2
(45) Date of Patent: Jan. 12, 2010

(54) DATA PROCESSING APPARATUS AND METHOD FOR PERFORMING DATA PROCESSING OPERATIONS ON FLOATING POINT DATA ELEMENTS

(75) Inventors: Simon Andrew Ford, Cambridge (GB); David James Seal, Cambridge (GB); Wilco Dijkstra, Cambridge (GB)

(73) Assignee: ARM Limited, Cambridge (GB)

( * ) Notice: Subject to any disclaimer, the term of this patent is extended or adjusted under 35 U.S.C. 154(b) by 1242 days.

(21) Appl. No.: 10/930,846

(22) Filed: Sep. 1, 2004

(65) Prior Publication Data

US 2005/0154773 A1   Jul. 14, 2005

(30) Foreign Application Priority Data

Jan. 13, 2004   (GB) ................. 0400669.8

(51) Int. Cl.
*G06F 7/38* (2006.01)
(52) U.S. Cl. ...................................... 708/495
(58) Field of Classification Search .......... 708/495
See application file for complete search history.

(56) References Cited

U.S. PATENT DOCUMENTS

| | | | |
|---|---|---|---|
| 4,876,660 A | 10/1989 | Owen et al. | |
| 5,301,289 A | 4/1994 | Suzuki et al. | |
| 5,408,670 A | 4/1995 | Davies | |
| 5,481,743 A | 1/1996 | Baxter | |
| 5,530,817 A | 6/1996 | Masubuchi | |
| 5,761,103 A | 6/1998 | Oakland et al. | |
| 5,808,875 A | 9/1998 | McMahon et al. | |
| 5,822,619 A | 10/1998 | Sidwell | |
| 5,826,096 A | 10/1998 | Baxter | |
| 5,838,984 A | 11/1998 | Nguyen et al. | |

(Continued)

FOREIGN PATENT DOCUMENTS

EP   0 227 900   7/1987

(Continued)

OTHER PUBLICATIONS

O'Grady; "Hardware Support for Floating Point Map Function Generation"; Department of Computer Science and Engineering, Arizona State University, Apr. 1999, pp. 145-172.

(Continued)

*Primary Examiner*—Tan V Mai
(74) *Attorney, Agent, or Firm*—Nixon & Vanderhye P.C.

(57) ABSTRACT

Data processing apparatus and method perform data processing operations on floating point data elements. The data processing apparatus has processing logic for performing data processing operations on the floating point data elements, and decode logic operable to decode a data processing instruction in order to determine a corresponding data processing operation to be performed by the processing logic. The data processing instruction has an m-bit immediate value encoded therein. Further, constant generation logic is provided to perform a logical operation on the m-bit immediate value in order to generate an n-bit floating point constant for use as at least one input floating point data element for the processing logic when performing the corresponding data processing operation. The values "n" and "m" are integers, and n is greater than m. This approach provides a particularly efficient technique for generating floating point constants.

33 Claims, 4 Drawing Sheets

U.S. PATENT DOCUMENTS

| | | | |
|---|---|---|---|
| 5,859,789 A | 1/1999 | Sidwell |
| 5,859,790 A | 1/1999 | Sidwell |
| 5,864,703 A | 1/1999 | van Hook et al. |
| 5,867,683 A | 2/1999 | Witt et al. |
| 5,870,618 A | 2/1999 | Fujikawa et al. |
| 5,875,355 A | 2/1999 | Sidwell et al. |
| 5,881,302 A | 3/1999 | Omata |
| 5,884,069 A | 3/1999 | Sidwell |
| 5,893,145 A | 4/1999 | Thayer et al. |
| 5,898,896 A | 4/1999 | Kaiser et al. |
| 5,907,865 A | 5/1999 | Moyer |
| 5,933,650 A | 8/1999 | van Hook et al. |
| 5,937,178 A | 8/1999 | Bluhm |
| 5,961,637 A | 10/1999 | Sturges et al. |
| 5,963,744 A | 10/1999 | Slavenburg et al. |
| 5,973,705 A | 10/1999 | Narayanaswami |
| 5,996,066 A | 11/1999 | Yung |
| 6,009,508 A | 12/1999 | May et al. |
| 6,038,583 A | 3/2000 | Oberman et al. |
| 6,047,304 A | 4/2000 | Ladwig et al. |
| 6,058,465 A | 5/2000 | Nguyen |
| 6,085,213 A | 7/2000 | Oberman et al. |
| 6,088,783 A | 7/2000 | Morton |
| 6,100,905 A | 8/2000 | Sidwell |
| 6,144,980 A | 11/2000 | Oberman |
| 6,145,077 A | 11/2000 | Sidwell et al. |
| 6,173,366 B1 | 1/2001 | Thayer et al. |
| 6,209,017 B1 | 3/2001 | Lim et al. |
| 6,223,198 B1 | 4/2001 | Oberman et al. |
| 6,223,277 B1 | 4/2001 | Karguth |
| 6,223,320 B1 | 4/2001 | Dubey et al. |
| 6,269,384 B1 | 7/2001 | Oberman |
| 6,292,888 B1 | 9/2001 | Nemirovsky et al. |
| 6,295,599 B1 | 9/2001 | Hansen et al. |
| 6,298,438 B1 | 10/2001 | Thayer et al. |
| 6,300,952 B1 | 10/2001 | Sidwell et al. |
| 6,334,176 B1 | 12/2001 | Scales, III et al. |
| 6,385,713 B2 | 5/2002 | Yung |
| 6,408,345 B1 | 6/2002 | Fuoco et al. |
| 6,546,480 B1 | 4/2003 | Mandavilli et al. |
| 6,564,314 B1 | 5/2003 | May et al. |
| 6,662,292 B1 | 12/2003 | Wilson |
| 6,748,521 B1 | 6/2004 | Hoyle |
| 2002/0133682 A1 | 9/2002 | Hansen et al. |
| 2002/0174323 A1 | 11/2002 | Biswas et al. |
| 2003/0056081 A1 | 3/2003 | Leach et al. |
| 2008/0320246 A1 * | 12/2008 | Fuhler et al. ............ 711/154 |

FOREIGN PATENT DOCUMENTS

| | | |
|---|---|---|
| EP | 1 197 845 | 4/2002 |
| GB | 2 352 065 | 1/2001 |

OTHER PUBLICATIONS

C. Hansen, "Architecture of a Broadband Mediaprocessor" IEEE, Digest of Papers of the Computer Society Computer Conference, Feb. 1996, pp. 334-340.

"TMS320C4x User's Guide" Texas Instruments, May 1999, internet: http://focus.ti.com/lit/ug/spru063c/spru063c.pdf.

"INDEL Operating System" INDEL AG, Mar. 1997, internet: http://www.indel.ch/ftp/Operating_Manuals/English/ISM_6.0_PC.pdf.

* cited by examiner

DATA PROCESSING APPARATUS AND METHOD FOR PERFORMING DATA PROCESSING OPERATIONS ON FLOATING POINT DATA ELEMENTS

TECHNICAL FIELD

The present invention relates to a data processing apparatus and method for performing data processing operations on floating point data elements.

BACKGROUND

When performing data processing operations on floating point data elements, it is often the case that a floating point constant is required as one of the input floating point data elements. In the execution of any particular program, it is likely that a number of such floating point constants will be required. If a program is considered as having an instruction area containing the instructions making up the program, and a data area containing data required when executing the program, then typically any required floating point constants will be specified in the data area of the program. When the program is installed on a data processing apparatus, these various floating point constants will be stored within memory, and accordingly will occupy valuable space within the memory.

Furthermore, when during the execution of a program a particular floating point constant is required, it will first be necessary to load that floating point constant from memory into a specified register. Typically, the required floating point constant will be identified by the generation of a pointer to the location in memory storing that constant. It will be appreciated that this will have an adverse effect on the performance of the program, since it will take time to establish the required pointer, and additional time to then load the floating point constant from memory into the required register, and these steps need to be taken before the operation that is to make use of that floating point constant can be performed.

In addition, it can be seen that the need to provide a load instruction in order to load the floating point constant from memory to a specified register adversely impacts code density. Further, the width of the bus connecting the data processing apparatus with the memory system will determine the bandwidth available for performing load operations, and accordingly it can be seen that each time a load operation is required to move a floating point constant from memory to a register, this will use a portion of that load bandwidth, which is then not available for use in performing other load operations required by the program.

Whilst the above technique has been described in connection with the loading of floating point constants from a memory into a register prior to its use within a data processing apparatus, the same process can also be used to load integer constants from memory into a register. However, for integer constants a more efficient process has been developed. In particular, it is known to encode within a particular instruction an immediate value which can be used to produce an integer constant for storing within a register. For example, a move instruction may have encoded therein an immediate value, and execution of the move instruction will cause the immediate value to be expanded as required to the size of a register, and then stored within a particular register identified by the move instruction.

As a particular example, in situations where a 32-bit instruction set is used, a certain number of bits of the instruction encoding space, for example 8 bits or 12 bits of the 32-bit instruction, will be used to specify an immediate value. If the register into which the integer constant specified by that immediate value is to be placed is a 32-bit register, then the immediate value can be zero extended (in the example of an unsigned integer constant) or sign extended (in the example of a signed integer constant) to 32-bits and then stored within the specified register. It has been found that such an approach enables a useful range of integer constants to be specified by an immediate value encoded within an instruction. It will be appreciated that the range of possible immediate values defines a corresponding continuous range of integer constants, and it is often the case that that continuous range of integer constants includes most integer constants that are considered useful in integer processing operations.

As a further enhancement to the above approach, ARM Limited have provided in their instruction set an instruction encoding which allows an 8-bit immediate value to be specified, and then a further 4-bits to be specified to identify a rotation to be applied to the immediate value in order to specify its location within a register (with the remaining bits of the register being filled with a predetermined sequence of ones or zeros). By allowing an immediate value to be specified, along with a rotation to be applied to that immediate value in order to determine its location within the register, further flexibility in the choice of integer constants is provided.

It will be appreciated that the use of an immediate value encoded within an instruction as the means for specifying an integer constant provides significant performance improvements over the earlier described prior art, where the constant was first stored in memory, and then loaded from memory into a register as required. In particular, by encoding the immediate value within the instruction, there is no need to perform a load operation, thereby improving code density, and increasing performance. Further, space in memory does not need to be set aside for the storing of such constants.

However, whilst useful integer constants can readily be specified by an immediate value encoded within an instruction, since there is a clear correspondence between the range of immediate values specifiable within the instruction encoding and the corresponding range of integer constants, this is not the case for floating point constants. In particular, floating point numbers have a more complex representation than integer numbers, a floating point number having a sign field, an exponent field, and a fraction field contained therein. In addition, the useful floating point numbers that are likely to be required as floating point constants do not follow any clear sequence, and accordingly it has up to now been considered not possible to represent a useful range of floating point constants through use of an immediate value encoded within an instruction.

Accordingly, up to now, when floating point constants are required, they are first loaded from memory into a register using the earlier described prior art techniques. However, as mentioned earlier, such an approach has an adverse effect on performance and code density, and also causes valuable memory space to be used for storage of required floating point constants. Accordingly, it will be desirable to provide an improved technique for providing floating point constants for use in floating point operations.

SUMMARY

Viewed from a first aspect, data processing apparatus comprises: processing logic operable to perform data processing operations on floating point data elements; decode logic operable to decode a data processing instruction in order to determine a corresponding data processing operation to be performed by the processing logic, the data processing instruction having an m-bit immediate value encoded therein; and constant generation logic operable to perform a logical operation on the m-bit immediate value in order to generate an n-bit floating point constant for use as at least one input floating point data element for the processing logic when performing the corresponding data processing operation, where n and m are integers and n is greater than m.

Constant generation logic is provided within a data processing apparatus that is operable to perform a logical operation on an m-bit immediate value encoded within a data processing instruction in order to generate an n-bit floating point constant for use as at least one input floating point data element for processing logic used to perform a data processing operation. The inventors realised that a logical operation can be used to expand an m-bit immediate value into an n-bit floating point constant, which allows the possible range of m-bit immediate values to specify a useful set of n-bit floating point constants. This provides a particularly efficient technique for generating n-bit floating point constants, which avoids the need for storing the required floating point constants in memory and then loading those constants from memory to registers as required.

It will be appreciated that the logical operation may take a variety of forms. However, in one embodiment, the logical operation causes a first predetermined portion of the m-bit immediate value to be used in generating an exponent portion of the floating point constant, and a second predetermined portion of the m bit immediate value to be used in generating a fraction portion of the floating point constant, the second predetermined portion being non-overlapping with the first predetermined portion. Hence, in accordance with this embodiment, different parts of the m-bit immediate value are used in the generation of the exponent and fraction of the floating point constant. It has been found that this approach allows for a relatively simple implementation of the logical operation, whilst still enabling a useful set of floating point constants to be generated.

In one embodiment, the logical operation allocates a preselected value as a sign bit of the generated floating point constant. Hence, as an example, the logical operation may be arranged to only generate positive floating point constants, and accordingly all of the generated floating point constants will be arranged to have the same value of sign bit. However, in an alternative embodiment, the logical operation causes a third predetermined portion of the m-bit immediate value to be used in generating a sign bit of the floating point constant, the third predetermined portion being non-overlapping with the first and second predetermined portions. Whilst this reduces the number of bits available for use in determining the exponent portion and fraction portion of the floating point constant, it does provide flexibility as to the choice of sign bit, and accordingly the same logical operation can generate both positive and negative floating point constants.

It will be appreciated that there are a number of different ways in which the various bits of the immediate value can be used to generate the various bits of the floating point constant. However, in one embodiment, the logical operation causes selected bits of the n-bit floating point constant to be generated from associated subsets of bits of the m-bit immediate value. In one particular embodiment, each associated subset of bits comprises one bit, such that each selected bit of the n-bit floating point constant is generated from an associated bit of the m-bit immediate value. This provides a particularly simple implementation of the logical operation, which has been found to enable a useful set of n-bit floating point constants to be generated.

Whilst in certain embodiments the value of each bit of the n-bit floating point constant will be dependent on at least one of the bits of the m-bit immediate value, this is not a requirement, and in alternative embodiments at least one of the bits of the n-bit floating point constant is not dependent on the m-bit immediate value. In one particular embodiment, a number of least significant bits of the fraction portion of the floating point constant are not dependent on the m-bit immediate value, but rather are generated by the logical operation in a predetermined manner. As a particular example, a certain number of the least significant bits of the fraction portion of the floating point constant may be set to zero irrespective of the value of the m-bit immediate value.

It will be appreciated that in one embodiment the constant generation logic may be arranged to generate a single n-bit floating point constant which is used only once in the corresponding data processing operation. However, in a more general embodiment, the constant generation logic is operable to perform the logical operation on the m-bit immediate value in order to generate at least one n-bit floating point constant for use as input floating point data elements for the processing logic when performing the corresponding data processing operation. Hence, as an example, one floating point constant may be generated that is used multiple times by the data processing operation, for example in each iteration of a multiple iteration data processing operation. Alternatively, multiple floating point constants may be generated which are used as input floating point data elements, for example a different floating point constant being used in each iteration of a multiple iteration data processing operation. Alternatively, multiple of the generated n-bit floating point constants may be used in the same iteration.

In one embodiment, the processing logic has a number of lanes of parallel processing, and is operable in response to the data processing instruction to perform in parallel the corresponding data processing operation within each said lane of parallel processing. Such processing is often referred to as Single Instruction Multiple Data (SIMD) processing, and in accordance with the SIMD approach, multiple data elements are placed in different lanes, and then an operation is performed in parallel on those data elements. In one embodiment, within each said lane of parallel processing one of said at least one floating point constants is used as an input floating point data element. Hence, it may be the case that the same generated floating point constant is used as an input floating point data element in each lane, or alternatively it may be the case that different floating point constants are used as input floating point data elements in each lane. Further, it is possible that one generated floating point constant is used as an input floating point data element in certain lanes, whilst a different floating point constant is used in other lanes, such functionality being useful for example in performing mask type functions, logical OR operations on particular lanes, etc.

The data processing instruction can take a variety of forms. In one embodiment, the data processing instruction is an OR instruction, the processing logic being operable in response to the OR instruction to perform a logical OR operation on first and second source operands, the first source operand being identified by the OR instruction and comprising a plurality of first input data elements, and the second operand being generated by the constant generation logic and comprising a corresponding plurality of n-bit floating point constants forming second input floating point data elements, such that each said lane of parallel processing contains one of said first input data elements and a corresponding second input floating point data element. In such embodiments, it will be appreciated that the first input data elements may also be floating point data elements, but there is no requirement for them to be so. Indeed, in other embodiments, the first input data elements may be integers.

In one embodiment, the data processing apparatus further comprises a register data store having a plurality of registers operable to store floating point data elements for access by the processing logic. This provides for efficient access to the floating point data elements by the processing logic as and when required, avoiding the need to access those data elements from memory each time they are needed.

In one embodiment, the data processing instruction is a move instruction specifying the m-bit immediate value and a register identifier, the constant generation logic being operable to generate the n-bit floating point constant from the m-bit immediate value specified by the move instruction, and the processing logic being operable to cause that n-bit floating point constant to be stored in a register of the register data store as determined from the register identifier. Hence in this particular instance, the corresponding data processing operation performed by the processing logic involves merely the handling of the movement of the floating point constant(s) generated by the constant generation logic into one or more specified registers of the register data store. These generated floating point constants may be routed through the processing logic to the register data store, or alternatively may be routed directly from the constant generation logic to the register store under the control of the processing logic.

It will be appreciated that the register identifier may identify a single register, or may alternatively identify more than one register.

In embodiments where multiple lanes of parallel processing are provided, the constant generation logic can be arranged to be operable to generate from the m-bit immediate value a different n-bit floating point constant for each said lane of parallel processing, and the processing logic is then operable to cause those n-bit floating point constants to be stored in respective lanes of one or more registers of the register data store as determined from the register identifier.

In an alternative embodiment, the data processing instruction is an arithmetic instruction, the processing logic being operable in response to the arithmetic instruction to perform an arithmetic operation on a plurality of input floating point data elements, at least one of the input floating point data elements comprising the n-bit floating point constant as generated by the constant generation logic. As with the other described embodiments of the data processing instruction, this arithmetic instruction may optionally be arranged to cause the corresponding arithmetic operation to be performed in parallel within each of a plurality of lanes of parallel processing.

It will be appreciated that the logical operation performed by the constant generation logic may be fixed. However, in alternative embodiments, the logical operation may be selected from one of a plurality of predetermined logical operations. The actual logical operation performed by the constant generation logic may then be selected dependent on the instruction decoded by the decode logic.

Viewed from a second aspect, a method of operating a data processing apparatus to perform data processing operations on floating point data elements comprises the steps of: (a) decoding a data processing instruction in order to determine a corresponding data processing operation to be performed, the data processing instruction having an m-bit immediate value encoded therein; (b) performing a logical operation on the m-bit immediate value in order to generate an n-bit floating point constant, where n and m are integers and n is greater than m; and (c) using the n-bit floating point constant as at least one input floating point data element when performing the corresponding data processing operation.

Viewed from a third aspect, a computer program product comprises a computer program including at least one data processing instruction which when executed causes a data processing apparatus to operate in accordance with the method of the second aspect of the present invention.

DETAILED DESCRIPTION

Figure 1:
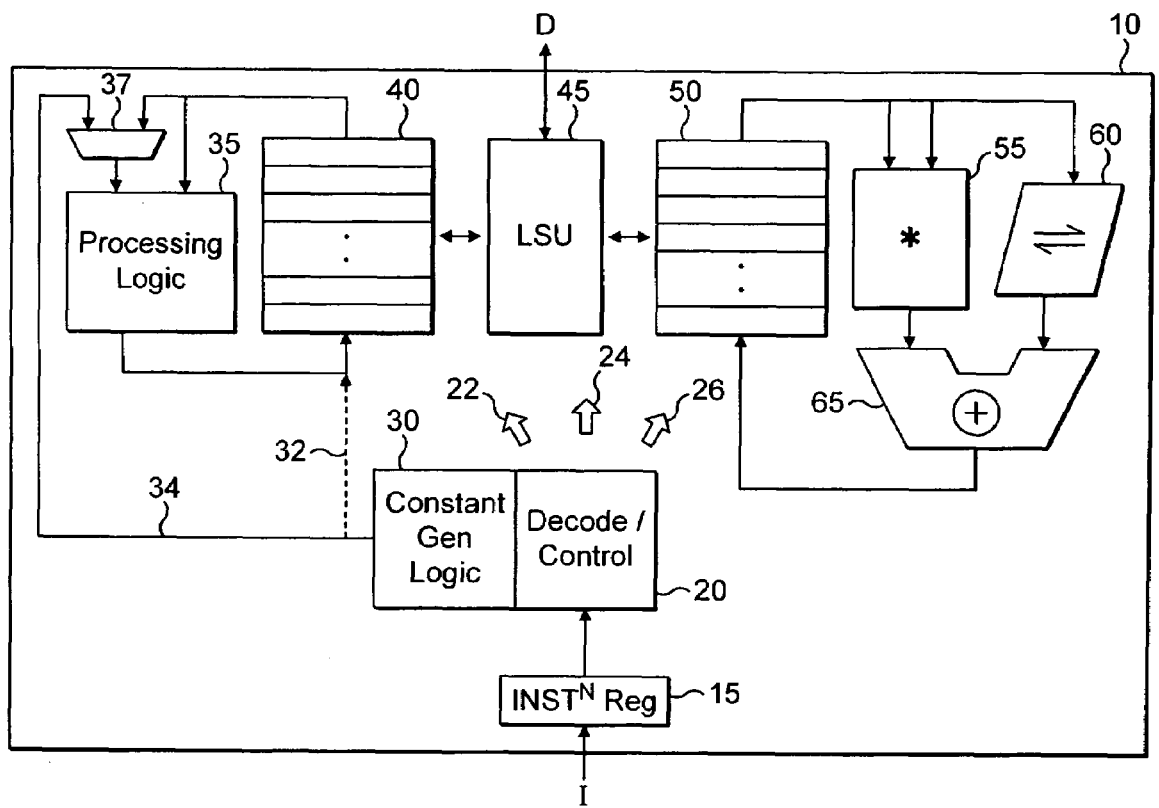
FIG. 1 is a block diagram schematically illustrating a data processing system in accordance with one example embodiment.

FIG. 1 schematically illustrates a data processing system (integrated circuit) 10 incorporating both integer processing logic and floating point processing logic. The integer processing portion can be considered to be a standard ARM processor core incorporating an integer register data store 50, a multiplier 55, a shifter 60, an adder 65, as well as many other circuit elements which have not, for the sake of clarity, been illustrated. In operation, such an integer processor core stores fixed length 32-bit data values within the register data store 50 and manipulates these data values using the multiplier 55, shifter 60 and adder 65 under control of data processing instructions, passed via the instruction register 15 to the decode and control logic 20. The decode and control logic 20 produces control signals over path 26 which control the operation of the integer processing elements in a conventional way.

As also illustrated in FIG. 1, the integrated circuit 10 includes various floating point processing logic, including a register data store 40 and dedicated processing logic 35. If a data processing instruction received by the decode and control logic 20 specifies an operation to be performed with respect to floating point data elements, then the decode and control logic 20 is arranged to issue the necessary control signals over path 22 to the floating point processing logic in order to cause the processing logic 35 to execute the required operation.

The data processing system 10 is coupled with memory via the load store unit (LSU) 45. The LSU's operation is controlled by the decode and control logic 20 via control signals issued over path 24 dependent on instructions decoded by the decode and control logic 20. By this approach, data elements can be loaded from memory into either the data store 40 or the register data store 50 as required, and further any data elements held within either of the register data stores 40, 50 can be stored to memory when they are no longer required by the data processing system 10.

In accordance with example embodiments, certain floating point data processing instructions are able to specify m-bit immediate value which can be used to generate one or more floating point constants. In particular, the constant generation logic 30, which can be considered to be adjacent to, or forming part of, the decode and control logic 20, is arranged to receive an immediate value decoded by the decode and control logic 20 from such a floating point data processing instruction, and to apply a logical operation to that m-bit immediate value in order to generate one or more floating point constants. The one or more floating point constants produced can then either be sent directly to the register data

| Sign | Biased exponent | Mantissa fraction |
|---|---|---|
| 0 | ~AAAAABCD | EFGH0000000000000000000 |

In accordance with this logical operation, the value of the sign bit is preset to be zero, and accordingly only positive floating point constants are produced. In particular, the following table illustrates the values of floating point constants that can be produced dependent on the values of ABCDEFGH:

TABLE 1

| | ABCD | | | | | | | | | | | | | | | |
|---|---|---|---|---|---|---|---|---|---|---|---|---|---|---|---|---|
| EFGH | 0000 | 0001 | 0010 | 0011 | 0100 | 0101 | 0110 | 0111 | 1000 | 1001 | 1010 | 1011 | 1100 | 1101 | 1110 | 1111 |
| 0000 | 2.0 | 4.0 | 8.0 | 16.0 | 32.0 | 64.0 | 128.0 | 256.0 | * | * | 0.03125 | 0.0625 | 0.125 | 0.25 | 0.5 | 1.0 |
| 0001 | 2.125 | 4.25 | 8.5 | 17.0 | 34.0 | 68.0 | 136.0 | 272.0 | * | * | * | * | * | * | 0.53125 | 1.0625 |
| 0010 | 2.25 | 4.5 | 9.0 | 18.0 | 36.0 | 72.0 | 144.0 | 288.0 | * | * | * | * | * | 0.28125 | 0.5625 | 1.125 |
| 0011 | 2.375 | 4.75 | 9.5 | 19.0 | 38.0 | 76.0 | 152.0 | 304.0 | * | * | * | * | * | * | 0.59375 | 1.1875 |
| 0100 | 2.5 | 5.0 | 10.0 | 20.0 | 40.0 | 80.0 | 160.0 | 320.0 | * | * | * | * | 0.15625 | 0.3125 | 0.625 | 1.25 |
| 0101 | 2.625 | 5.25 | 10.5 | 21.0 | 42.0 | 84.0 | 168.0 | 336.0 | * | * | * | * | * | * | 0.65625 | 1.3125 |
| 0110 | 2.75 | 5.5 | 11.0 | 22.0 | 44.0 | 88.0 | 176.0 | 352.0 | * | * | * | * | * | 0.34375 | 0.6875 | 1.375 |
| 0111 | 2.875 | 5.75 | 11.5 | 23.0 | 46.0 | 92.0 | 184.0 | 368.0 | * | * | * | * | * | * | 0.71875 | 1.4375 |
| 1000 | 3.0 | 6.0 | 12.0 | 24.0 | 48.0 | 96.0 | 192.0 | 384.0 | * | * | * | 0.09375 | 0.1875 | 0.375 | 0.75 | 1.5 |
| 1001 | 3.125 | 6.25 | 12.5 | 25.0 | 50.0 | 100.0 | 200.0 | 400.0 | * | * | * | * | * | * | 0.78125 | 1.5625 |
| 1010 | 3.25 | 6.5 | 13.0 | 26.0 | 52.0 | 104.0 | 208.0 | 416.0 | * | * | * | * | * | 0.40625 | 0.8125 | 1.625 |
| 1011 | 3.375 | 6.75 | 13.5 | 27.0 | 54.0 | 108.0 | 216.0 | 432.0 | * | * | * | * | * | * | 0.84375 | 1.6875 |
| 1100 | 3.5 | 7.0 | 14.0 | 28.0 | 56.0 | 112.0 | 224.0 | 448.0 | * | * | * | * | 0.21875 | 0.4375 | 0.875 | 1.75 |
| 1101 | 3.625 | 7.25 | 14.5 | 29.0 | 58.0 | 116.0 | 232.0 | 464.0 | * | * | * | * | * | * | 0.90625 | 1.8125 |
| 1110 | 3.75 | 7.5 | 15.0 | 30.0 | 60.0 | 120.0 | 240.0 | 480.0 | * | * | * | * | * | 0.46875 | 0.9375 | 1.875 |
| 1111 | 3.875 | 7.75 | 15.5 | 31.0 | 62.0 | 124.0 | 248.0 | 496.0 | * | * | * | * | * | * | 0.96875 | 1.9375 | store 40 (as indicated by the dotted line 32), or if the floating point data processing instruction requires additional operations to be performed, the generated floating point constant(s) may be routed via path 34 and multiplexer 37 to one of the inputs of the processing logic 35. As can be seen from FIG. 1, the processing logic 35 can either receive two data elements retrieved from the data store 40, or alternatively may receive one data element from the data store 40, whilst receiving a floating point constant from the constant generation logic 30 (via the multiplexer 37) as a second input data element.

Whilst the data store 40 will typically store floating point data elements, it will be appreciated that there is no requirement that only floating point data elements are stored within the data store 40, and indeed in some embodiments certain integer data elements will also be stored within the data store 40, since certain of the operations performed by the processing logic 35 may require both an integer input data element and a floating point input data element.

Figure 2:
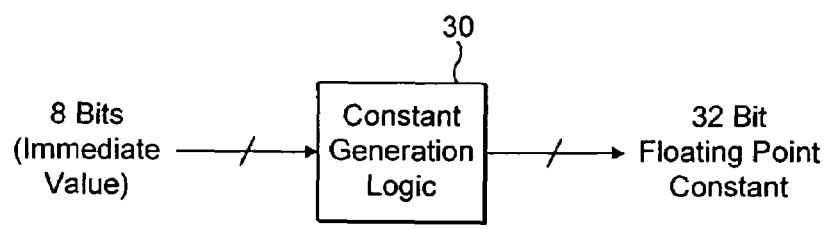
FIG. 2 illustrates the input and output from the constant generation logic of FIG. 1 in accordance with one example embodiment.
Figure 3:
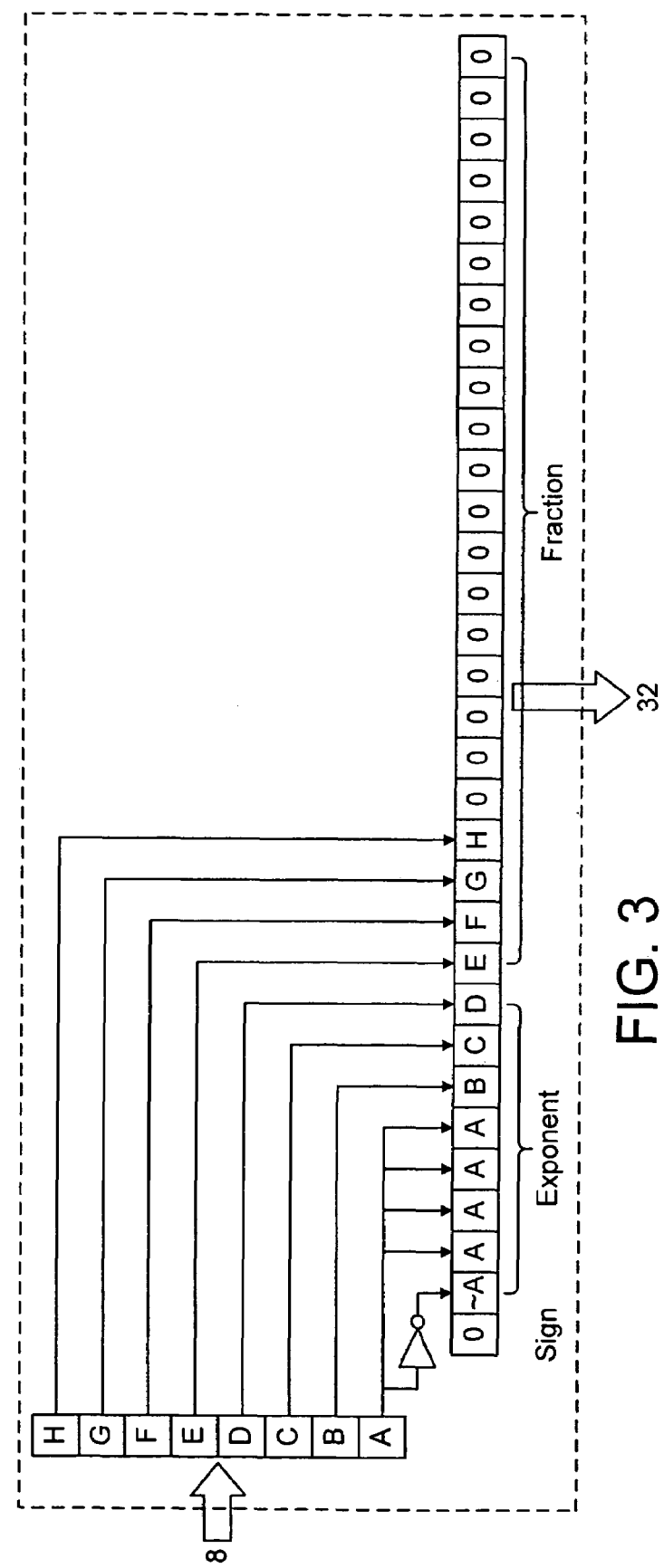
FIGS. 3 and 4 schematically illustrate two different forms of logical operation that may be performed by the constant generation logic of FIG. 1.

As shown in FIG. 2, in one embodiment the constant generation logic 30 is arranged to receive from the decode and control logic 20 an 8-bit immediate value decoded from a floating point data processing instruction. Based thereon, the constant generation logic 30 is arranged to perform a logical operation on that 8-bit immediate value in order to generate a 32-bit floating point constant. Two particular examples of such a logical operation that may be performed by the constant generation logic 30 are illustrated schematically in FIGS. 3 and 4. As is apparent from FIG. 3, if the 8 bits of the immediate value are "ABCDEFGH" (with A being the most significant bit and H being the least significant bit), then it can be seen that the logical operation results in the generation of a floating point constant of the following form:

In the above table, the asterisks are used for constants that need more than five decimal places to represent them precisely.

It has been found that the set of floating point constants illustrated in the above table includes a significant number of useful floating point constants for many floating point data processing operations. Accordingly, through implementation of the simple logical operation illustrated with reference to FIG. 3, many different useful floating point constants can be generated from the 8 bit immediate value. As an example, if the 8 bit immediate value is "00000000", this will cause a floating point constant of 2.0 to be produced. Alternatively, if the immediate value is of the form 00100100, this will cause a floating point constant of 10.0 to be produced.

Figure 4:
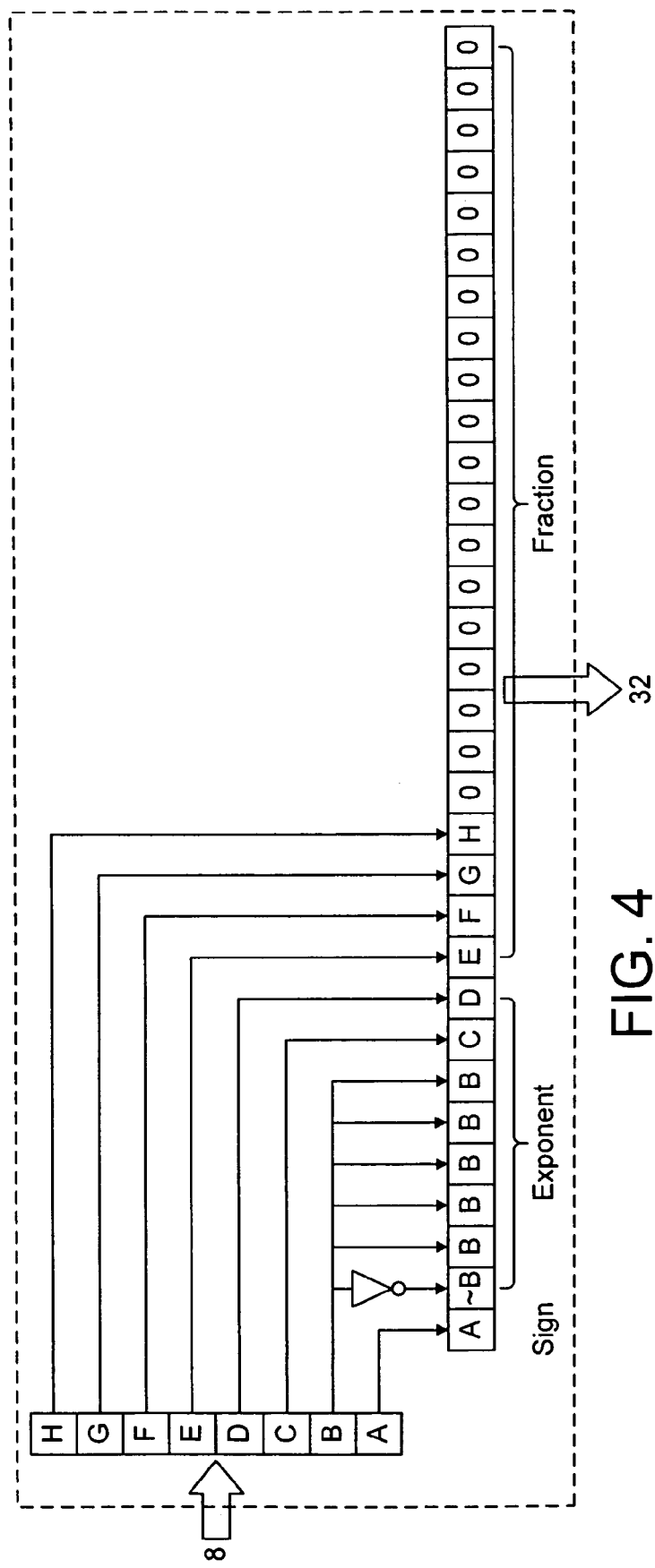

FIG. 4 illustrates an alternative logical operation that may be performed by the constant generation logic 30, which will result in a floating point constant of the following form being generated:

| Sign | Biased exponent | Mantissa fraction |
|---|---|---|
| A | ~BBBBBBCD | EFGH0000000000000000000 |

This alternative form of logical operation enables floating point constants from the left half of the upper portion of Table 1, plus the right half of the lower portion of Table 1, to be produced, along with the negated versions of all of those floating point constants. Again, it has been found that this enables a useful set of floating point constants to be generated from the 8-bit immediate value using a simple logical operation performed by the constant generation logic 30.

Figure 5:
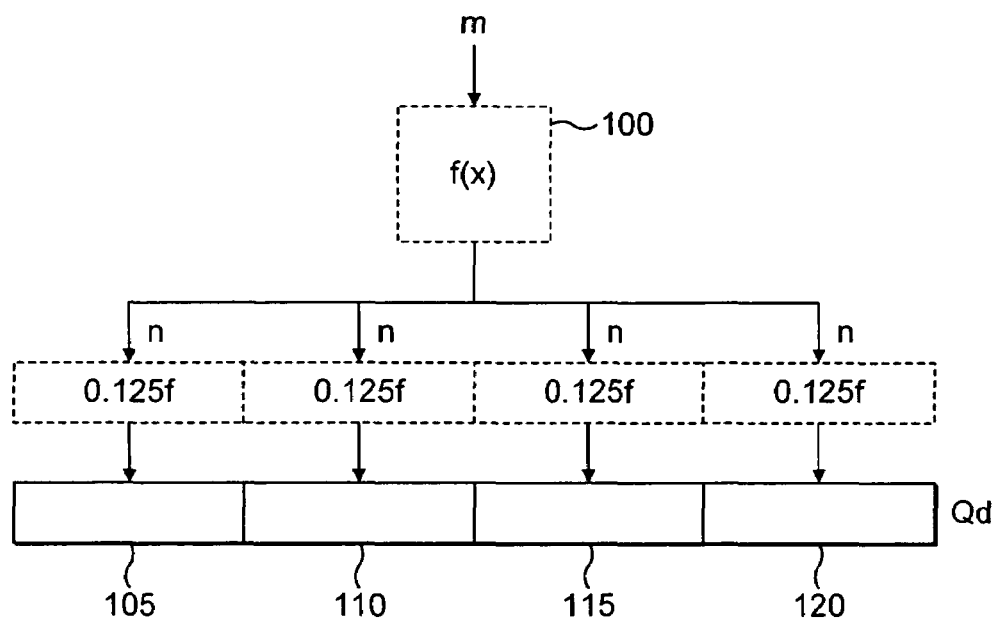
FIG. 5 schematically illustrates the processing of a move instruction used to generate floating point constants in accordance with one example embodiment.

The principles of the example embodiments described above can be extended for use in SIMD implementations, where the floating point data processing instruction specifies a data processing operation to be performed in parallel in multiple lanes of parallel processing within the processing logic 35. FIG. 5 illustrates an example situation where a SIMD move instruction is to be executed. This instruction will specify an m-bit immediate value, which the constant generation logic 30 would then use to generate an n-bit floating point constant. The move instruction may then specify that this floating point constant should be replicated across four lanes of parallel processing, to then cause the resultant data to be stored in a single register Qd.

In a particular implementation, 32-bit floating point constants are produced, and the register Qd is 128 bits in length. The function f(x) 100 illustrated in FIG. 5 identifies the operation to be performed by the constant generation logic and the subsequent data processing operation to be performed under the control of the processing logic 35. In this instance, the constant generation logic 30 produces a single floating point constant which is then replicated across four lanes so as to cause the floating point constant to be stored repetitively at locations 105, 110, 115 and 120 within the register Qd. As discussed earlier, the data stored into the register Qd can be stored directly over path 32 into the data store 40 under the control of the processing logic 35, or alternatively may be routed through the processing logic 35 via path 34, before then being output to the data store 40. In the particular example illustrated in FIG. 5, it is assumed that the floating point constant produced represents the value 0.125, but clearly any of the other values specified in Table 1 could be produced dependent on the value of the immediate value m and dependent on whether the logical operation performed by the constant generation logic 30 is that illustrated in FIG. 3 or that illustrated in FIG. 4.

Figure 6:
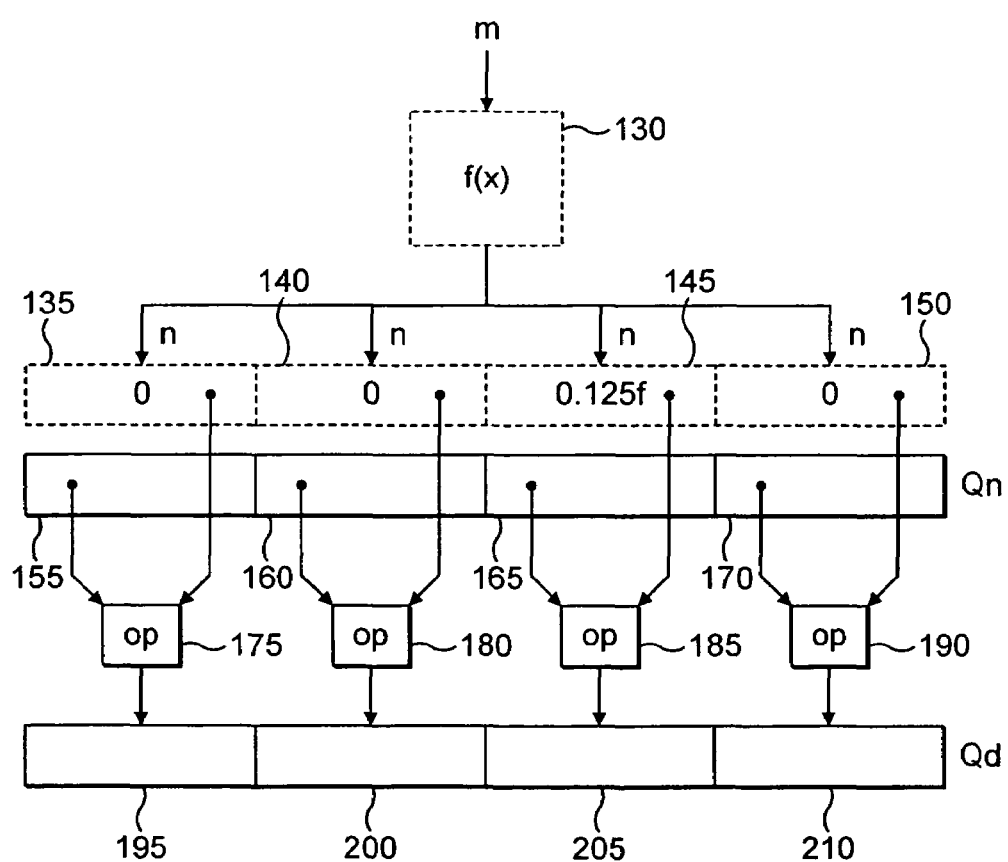
FIG. 6 schematically illustrates a data processing instruction which includes the generation of at least one floating point constant in accordance with one example embodiment.

FIG. 6 illustrates the operation of an alternative floating point data processing instruction, which specifies an operation 175, 180, 185, 190 to be performed in parallel across four different lanes of parallel processing. In preferred embodiments, the operations 175, 180, 185 and 190 are identical, each operation taking as one of its input data elements a data element from a corresponding lane within a source register Qn. The other input data element to each lane is determined by the floating point constant generated by the constant generation logic 30. In this particular example, the constant generation logic 30 again produces a floating point constant representing the value 0.125, but in this example, that floating point constant is only input into the second lane of parallel processing, with the other three lanes receiving a floating point constant representing the value zero.

It will be appreciated that there are a number of ways in which the multiple floating point constants may be generated. In one embodiment, the instruction may specify that the floating point constant to be generated from the immediate value is to be provided to only a subset of the lanes, for example one specified lane. The instruction may also provide information indicative of a floating point constant to be used for the other lanes, which can be forwarded as a control value by the decode logic to the constant generation logic. The constant generation logic may then be arranged to generate one of a number of floating point constants dependent on the value of that control signal.

As an example, an ADD instruction may specify one lane that is to receive the floating point constant derived from the immediate, whilst also indicating that the other lanes should receive a value of 0.0. An appropriate control signal can then be issued to the constant generation logic to cause a floating point constant of 0.0 to be provided as an input to the remaining lanes. As another example, a multiply instruction may specify one lane that is to receive the floating point constant derived from the immediate, whilst also indicating that the other lanes should receive a value of 1.0. An appropriate control signal can then be issued to the constant generation logic to cause a floating point constant of 1.0 to be provided as an input to the remaining lanes.

As an alternative to the control value, different floating point constants may be generated by the constant generation logic by using different bits of the immediate value, or alternatively more than one immediate value may be specified by the instruction.

It can be seen that through the above described approach a mask function can be provided, such that the generated floating point constant is only utilised in one of the lanes. It will be appreciated that the operation 175, 180, 185, 190 may take a variety of forms, for example a logical OR or AND operation, an arithmetic operation such as an addition, subtraction, multiplication, division, etc.

The logical operation f(x) 130 illustrated in FIG. 6 represents the entirety of the operation to be performed following decode of the floating point data processing operation by the decode and control logic 20. It hence incorporates the performance of the logical operation by the constant generation logic 30 in order to generate the required floating point constants, and the subsequent data processing operations required to be performed by the processing logic 35.

Although particular embodiments have been described herein, it will be appreciated that the claims are not limited thereto and that many modifications and additions thereto may be made within the scope of the claims.

We claim:

1. A data processing apparatus, comprising:
    processing logic circuitry configured to perform data processing operations on floating point data elements including a source operand;
    decode logic circuitry configured to decode a data processing instruction in order to determine a corresponding data processing operation to be performed by the processing logic, the data processing instruction having an m-bit immediate value encoded therein, said m-bit immediate value being indicative of said source operand; and
    constant generation logic circuitry for performing a logical expansion operation to expand the m-bit immediate value into an n-bit floating point constant as said source operand for use as at least one input floating point data element for the processing logic circuitry when performing the corresponding data processing operation, where n and m are integers and n is greater than m.

2. A data processing apparatus as claimed in claim 1, wherein the logical expansion operation causes a first predetermined portion of the m-bit immediate value to be used in generating an exponent portion of the floating point constant, and a second predetermined portion of the m bit immediate value to be used in generating a fraction portion of the floating point constant, the second predetermined portion being non-overlapping with the first predetermined portion.

3. A data processing apparatus as claimed in claim 2, wherein the logical expansion operation allocates a preselected value as a sign bit of the generated floating point constant.

4. A data processing apparatus as claimed in claim 2, wherein the logical expansion operation causes a third predetermined portion of the m-bit immediate value to be used in generating a sign bit of the floating point constant, the third predetermined portion being non-overlapping with the first and second predetermined portions.

5. A data processing apparatus as claimed in claim 1, wherein the logical expansion operation causes selected bits of the n-bit floating point constant to be generated from associated subsets of bits of the m-bit immediate value.

6. A data processing apparatus as claimed in claim 5, wherein each associated subset of bits comprises one bit, such that each selected bit of the n-bit floating point constant is generated from an associated bit of the m-bit immediate value.

7. A data processing apparatus as claimed in claim 1, wherein at least one of the bits of the n-bit floating point constant is not dependent on the m-bit immediate value.

8. A data processing apparatus as claimed in claim 1, wherein the constant generation logic circuitry is configured to perform the logical expansion operation on the m-bit immediate value in order to generate at least one n-bit floating point constant for use as input floating point data elements for the processing logic circuitry when performing the corresponding data processing operation.

9. A data processing apparatus as claimed in claim 8, wherein the processing logic circuitry has a number of lanes of parallel processing, and is configured in response to the data processing instruction to perform in parallel the corresponding data processing operation within each said lane of parallel processing, within each said lane of parallel processing one of said at least one floating point constants being used as an input floating point data element.

10. A data processing apparatus as claimed in claim 9, wherein the constant generation logic circuitry is configured to generate one n-bit floating point constant for providing as an input floating point data element to each said lane of parallel processing.

11. A data processing apparatus as claimed in claim 9, wherein the data processing instruction is an OR instruction, the processing logic circuitry being configured in response to the OR instruction to perform a logical OR operation on first and second source operands, the first source operand being identified by the OR instruction and comprising a plurality of first input data elements, and the second operand being generated by the constant generation logic circuitry and comprising a corresponding plurality of n-bit floating point constants forming second input floating point data elements, such that each said lane of parallel processing contains one of said first input data elements and a corresponding second input floating point data element.

12. A data processing apparatus as claimed in claim 1, further comprising:
a register data store having a plurality of registers configured to store floating point data elements for access by the processing logic circuitry.

13. A data processing apparatus as claimed in claim 1, further comprising:
a register data store having a plurality of registers operable to store floating point data elements for access by the processing logic circuitry;
wherein the data processing instruction is a move instruction specifying the m-bit immediate value and a register identifier, the constant generation logic circuitry being configured to generate the n-bit floating point constant from the m-bit immediate value specified by the move instruction, and the processing logic circuitry being configured to cause that n-bit floating point constant to be stored in a register of the register data store as determined from the register identifier.

14. A data processing apparatus as claimed in claim 13, wherein the processing logic circuitry has a number of lanes of parallel processing, and is configured in response to the data processing instruction to perform in parallel the corresponding data processing operation within each said lane of parallel processing, within each said lane of parallel processing one of said at least one floating point constants being used as an input floating point data element, wherein the constant generation logic circuitry is configured to generate from the m-bit immediate value a different n-bit floating point constant for each said lane of parallel processing, and the processing logic is operable to cause those n-bit floating point constants to be stored in respective lanes of one or more registers of the register data store as determined from the register identifier.

15. A data processing apparatus as claimed in claim 1, wherein the data processing instruction is an arithmetic instruction, the processing logic circuitry being configured in response to the arithmetic instruction to perform an arithmetic operation on a plurality of input floating point data elements, at least one of the input floating point data elements comprising the n-bit floating point constant as generated by the constant generation logic circuitry.

16. A data processing apparatus as claimed in claim 1, wherein the logical expansion operation is selected from one of a plurality of predetermined logical operations.

17. A method of operating a data processing apparatus to perform data processing operations on floating point data elements including a source operand, the method comprising the steps of:
(a) decoding a data processing instruction in order to determine a corresponding data processing operation to be performed, the data processing instruction having an m-bit immediate value encoded therein said m-bit immediate value being indicative of said source operand;
(b) performing a logical expansion operation to expand the m-bit immediate value into an n-bit floating point constant, as said source operand, where n and m are integers and n is greater than m; and
(c) using the n-bit floating point constant as at least one input floating point data element when performing the corresponding data processing operation.

18. A method as claimed in claim 17, wherein said step (b) comprises the steps of:
using a first predetermined portion of the m-bit immediate value to generate an exponent portion of the floating point constant; and
using a second predetermined portion of the m bit immediate value to generate a fraction portion of the floating point constant, the second predetermined portion being non-overlapping with the first predetermined portion.

19. A method as claimed in claim 18, wherein during said step (b) a preselected value is allocated as a sign bit of the generated floating point constant.

20. A method as claimed in claim 18, wherein said step (b) further comprises the step of:
using a third predetermined portion of the m-bit immediate value to generate a sign bit of the floating point constant, the third predetermined portion being non-overlapping with the first and second predetermined portions.

21. A method as claimed in claim 17, wherein during said step (b) selected bits of the n-bit floating point constant are generated from associated subsets of bits of the m-bit immediate value.

22. A method as claimed in claim 21, wherein each associated subset of bits comprises one bit, such that each selected bit of the n-bit floating point constant is generated from an associated bit of the m-bit immediate value.

23. A method as claimed in claim 17, wherein at least one of the bits of the n-bit floating point constant is not dependent on the m-bit immediate value.

24. A method as claimed in claim 17, wherein said step (b) performs the logical expansion operation on the m-bit immediate value in order to generate at least one n-bit floating point constant for use as input floating point data elements in said step (c) when performing the corresponding data processing operation.

25. A method as claimed in claim 24, wherein at said step (c) the corresponding data processing operation is performed in parallel within each of a number of lanes of parallel processing within the data processing apparatus, within each said lane of parallel processing, one of said at least one floating point constants being used as an input floating point data element.

26. A method as claimed in claim 25, wherein said at step (b) one n-bit floating point constant is generated for providing as an input floating point data element to each said lane of parallel processing.

27. A method as claimed in claim 25, wherein the data processing instruction is an OR instruction, at said step (c) a logical OR operation being performed on first and second source operands, the first source operand being identified by the OR instruction and comprising a plurality of first input data elements, and the second operand being generated at said step (b) and comprising a corresponding plurality of n-bit floating point constants forming second input floating point data elements, such that each said lane of parallel processing contains one of said first input data elements and a corresponding second input floating point data element.

28. A method as claimed in claim 17, further comprising the step of:
   storing, within a register data store having a plurality of registers, floating point data elements for access by the data processing apparatus.

29. A method as claimed in claim 17, further comprising the step of:
   storing, within a register data store having a plurality of registers, floating point data elements for access by the data processing apparatus;
   wherein the data processing instruction is a move instruction specifying the m-bit immediate value and a register identifier, at said step (b) the n-bit floating point constant being generated from the m-bit immediate value specified by the move instruction, and at said step (c) that n-bit floating point constant being stored in a register of the register data store as determined from the register identifier.

30. A method as claimed in claim 29 wherein at said step (c) the corresponding data processing operation is performed in parallel within each of a number of lanes of parallel processing within the data processing apparatus, within each said lane of parallel processing, one of said at least one floating point constants being used as an input floating point data element, wherein said step (b) generates from the m-bit immediate value a different n-bit floating point constant for each said lane of parallel processing, and at said step (c) those n-bit floating point constants are stored in respective lanes of one or more registers of the register data store as determined from the register identifier.

31. A method as claimed in claim 17, wherein the data processing instruction is an arithmetic instruction, at said step (c) an arithmetic operation being performed on a plurality of input floating point data elements, at least one of the input floating point data elements comprising the n-bit floating point constant as generated at said step (b).

32. A method as claimed in claim 17, further comprising the step of selecting the logical operation from one of a plurality of predetermined logical operations.

33. A computer program product comprising a computer program including at least one data processing instruction which when executed causes a data processing apparatus to operate in accordance with the method of claim 17.

* * * * *